July 9, 1929.  V. J. O'BRIEN  1,720,431
SELF ALIGNING BEARING
Filed July 11, 1927
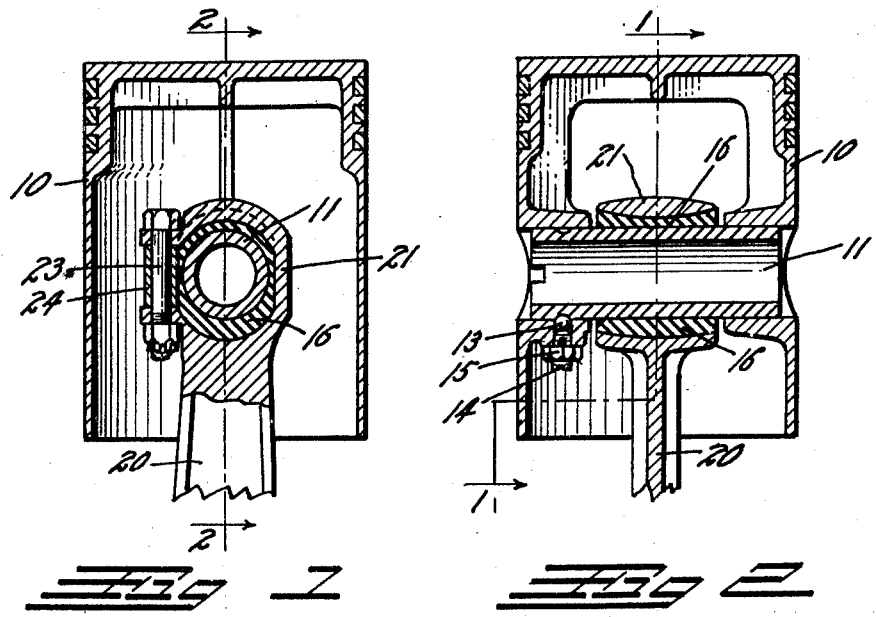
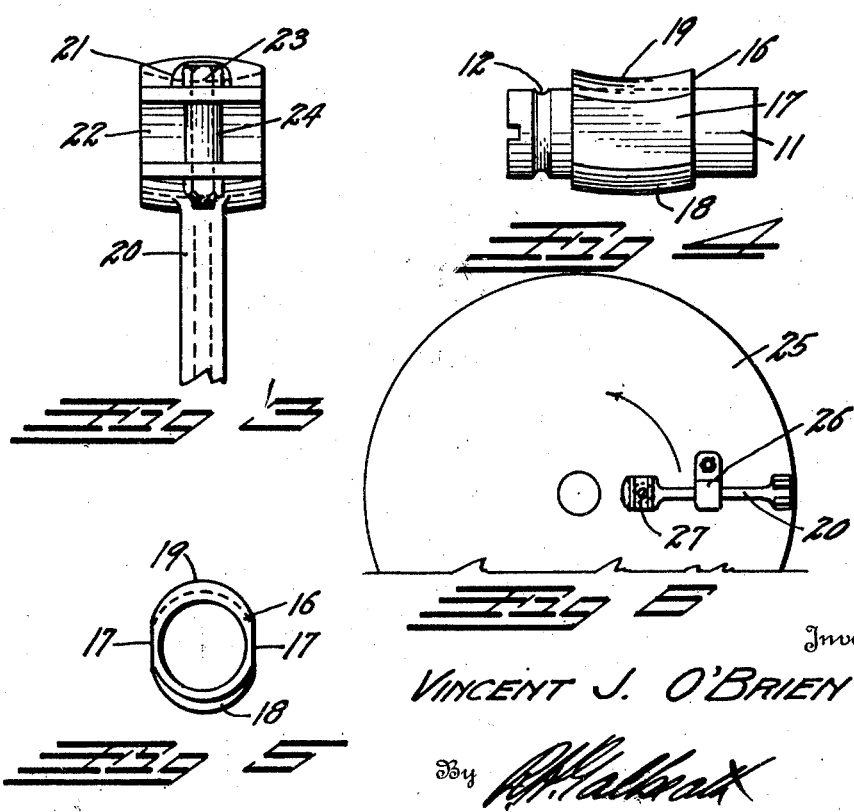
Inventor
VINCENT J. O'BRIEN
Attorney Patented July 9, 1929.

1,720,431

UNITED STATES PATENT OFFICE.

VINCENT J. O'BRIEN, OF DENVER, COLORADO.

SELF-ALIGNING BEARING.

Application filed July 11, 1927. Serial No. 204,671.

This invention relates to a self-aligning bearing and, while it is more particularly applicable to the joint between the connecting rod and the wrist pin in an internal combustion engine, it will find many other valuable applications. At present the wrist pins are ground to a close fit with the piston and connecting rod bearings. This accurate machining does not allow any play to accommodate misalignment between the cylinders and crank shaft axis so that strains are occasioned in the connecting rods and the cylinders are worn unevenly and out of round.

It is practically impossible to construct an engine with the cylinders at an exact 90° with the crank shaft axis, and should such a thing be possible, this alignment could not be preserved throughout the life of the engine owing to uneven wear on the crank shaft bearings and uneven scraping and replacement of worn bearings. The principal object of this invention is to provide a joint or connection between the connecting rod and the wrist pin of the piston which will accommodate the above mentioned inaccuracies in the engine and which will allow the piston to travel evenly throughout the length of the cylinder regardless of any lack of parallelism between the wrist pin and the crank shaft.

Another object of the invention is to incorporate the advantages of the first object into an engine without it being necessary to increase the reciprocating weight therein.

A further object is to provide a connection which will accommodate misalignment of pistons without allowing rotation thereof within the cylinder.

Other objects and advantages reside in the detail construction of the invention, which is designed for simplicity, economy and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a vertical section through a typical internal combustion engine cylinder, taken on the line 1—1, Fig. 2.

Fig. 2 is a similar view taken on the line 2—2, Fig. 1.

Fig. 3 is an edge elevation of the wrist pin extremity of the connecting rod.

Fig. 4 illustrates the wrist pin with my novel bushing in place thereon.

Fig. 5 is an end view of the bushing.

Fig. 6 is a diagrammatic view illustrating a step in the process of manufacture of the connecting rod employed in my invention.

At 10 is illustrated a typical internal combustion engine piston having the usual wrist pin 11. In the wrist pin 11 I form a peripheral, round-bottomed groove 12, in which a ball 13 is held by means of a set screw 14 locked in place by a lock nut 15. The set screw 14 is adjusted so that the ball 13 will project into the groove 12 without friction, but sufficiently far to prevent endwise movement of the wrist pin 11. The wrist pin, however, is free to rotate within the piston 10.

A bushing 16 of bronze, or similar bearing metal, surrounds the wrist pin 11 and is accurately fitted thereon. The bushing 16 is of unusual construction and is provided with two plane sides 17, a convexly curvated bottom 18 and a concavely curvated top 19. The convexity and concavity of the bottom and top extend longitudinally of the bushing about a common axis, that is, in side elevation, as in Fig. 4, the bushing presents a portion of an arc. In cross section, both the bottom and top of the bushing are convexly curved upon a common radius as illustrated in Figs. 1 and 5. At 20 is illustrated a connecting rod having a head 21, the interior of which is formed similarly to the exterior of the bushing 16. This head is split at one side as shown at 22, the sides of the split being held together by means of a bolt 23. A separator 24 surrounds the bolt 23 and maintains the split 22 at the proper separation to allow the head 21 to ride freely on the bushing 16 without play.

With this construction the ordinary crank movement of the engine causes the bushing to ride on the wrist pin 11. The wrist pin 11, however, is free to also ride within the piston 10 so that a free, unobstructed motion is obtained. In addition to this, the piston may rock in an arc parallel to the axis of the wrist pin, or similarly, the connecting rod 20 may rock in this arc to accommodate the inaccuracies in alignment in the engine. This rocking causes the head 21 to slide upon the arcuate bottom and top 18 and 19 of the bushing 16, the adjustment of the bolt and separator 23 and 24 being such as to allow freedom of movement thereon.

It has been found impractical to employ a ball or similar joint between a connecting rod and piston since it allows the piston to rotate. This rotation causes a boring action on the cylinder and also, in some types of motors, causes the extremities of the piston rings to become caught in cylinder ports. In this invention this objection is avoided since the plane faces 17 prevent horizontal rotation of the bushing within the connecting rod head 21. The head is provided at one side with an internal similar plane face adapted to engage one of the faces 17, and at the other side with the separator 24 which contacts with the other of the plane faces 17.

Any wear which may occur between the bushing and the head 21 may be easily taken up by grinding a portion off the length of the separator 24 so that the head may be drawn further closed. It should not be closed tight enough, however, to tightly clamp the bushing.

In a structure similar to the one disclosed, the greatest pressure and wear between the wrist pin and bushing occurs at the bottom thereof. On the explosion stroke, the wrist pin is pressing downwardly on the connecting rod, and on the compression stroke, the connecting rod is pressing upwardly on the wrist pin so that the pressure at all times is on the bottom of the wrist pin and on the bottom of the wrist pin bushing. It is desired to call attention to the fact that in my invention this pressure and wear are particularly accommodated since, owing to the downwardly bowed, arcuate construction of the bushing 16, its thickness is greater at the bottom than at the top. Therefore additional bearing metal is provided at the point of greatest wear.

It is also desired to call attention to the fact that the bushing 16 and the head 21 need not occupy any greater space nor be of any greater weight than the present connecting rod heads and bushings. At its upper edges the bushing is thicker than the usual bushing but this is compensated for by the fact that it is much thinner at its inner upper portion. This same compensation is true at the bottom where the thickened inner portion is compensated for by the thinner edge portion.

The manufacture of the bushing 16 calls for no unusual expenditures. A method of manufacturing the connecting rod head 21 is indicated in Fig. 6, in which a rotary drill table is outlined at 25 upon which a connecting rod 20 (or a series of connecting rods) is clamped at 26 in the usual manner, with its split 22 upwardly. A rotary mill is spaced away from the center of the table 25 a distance equal to the radius of the arc necessary to accommodate the arcuate faces of the bushing 16. This mill is fixed in this position with its stem 27 passing through the split 22 in the connecting rod. The simultaneous rotation of the mill and table will now form the interior surfaces of the head 21 to accurately receive the bushing 16.

This invention is designed as an improvement upon applicant's Patent No. 1,639,102, issued August 16, 1927.

While a specific form of the improvement has been described and illustrated herein, it is desired to be understood that the same may be varied, within the scope of the appended claims, without departing from the spirit of the invention.

Having thus described the invention, what I claim and desire to secure by Letters Patent is:—

1. In a bushing adapted to surround the wrist pin and receive the connecting rod of an internal combustion engine, curvated upper and lower faces extending longitudinally of said bushing comprising portions of arcs about a common axis, said axis being positioned beyond the outline of said bushing; and plane side faces joining said curvated faces.

2. In a bushing adapted to surround the wrist pin and receive the connecting rod of an internal combustion engine, curvated upper and lower faces extending longitudinally of said bushing comprising portions of arcs about a common axis, said axis being positioned beyond the outline of said bushing; and plane side faces joining said curvated faces, each of said curvated faces also being rounded transversely of said bushing to a common radius.

3. A joint between a wrist pin and a connecting rod comprising a bushing adapted to surround said wrist pin; a longitudinally concaved surface on the upper side of said bushing; a longitudinally convexed surface on the lower side of said bushing; and a head on said connecting rod having internal surfaces adapted to fit to the surfaces on said bushing.

4. A joint between a wrist pin and a connecting rod comprising a bushing adapted to surround said wrist pin; a longitudinally concaved surface on the upper side of said bushing; a longitudinally convexed surface on the lower side of said bushing; plane surfaces on the vertical sides of said bushing; and a head on said connecting rod having internal surfaces adapted to fit to the surfaces on said bushing.

5. A joint between a wrist pin and a connecting rod comprising a bushing adapted to surround said wrist pin; a longitudinally concaved surface on the upper side of said bushing; a longitudinally convexed surface on the lower side of said bushing; a head on said connecting rod having internal surfaces adapted to fit to the surfaces on said bushing, said head having an open side; means for preventing the separation of said open side; and other means for limiting the closing of said open side.

6. A joint between a wrist pin and a connecting rod comprising a bushing adapted to surround said wrist pin; a longitudinally concaved surface on the upper side of said bushing; a longitudinally convexed surface on the upper side of said bushing; a head on said connecting rod having internal surfaces adapted to fit to the surfaces on said bushing, said head having an open side; a bolt adapted to span said open side and limit its outward movement; and a separator surrounding said bolt and adapted to limit the inner movement of said open side.

7. A joint between a wrist pin and a connecting rod comprising a bushing adapted to surround said wrist pin; a longitudinally concaved surface on the upper side of said bushing; a longitudinally convexed surface on the lower side of said bushing, said upper and lower surfaces being provided with a transverse curve throughout their length, said curve having a common radius.

8. The combination with a piston having a wrist pin, of a bushing adapted to surround said wrist pin, said bushing having its upper and lower faces longitudinally curved about a common axis, said axis being located below both said upper and lower faces; and a connecting rod having a socket similarly curvated so as to receive said bushing.

In testimony whereof, I affix my signature.

VINCENT J. O'BRIEN.